(No Model.)
S. B. DOVER.
SUBSOIL PLOW.
No. 269,027. Patented Dec. 12, 1882.
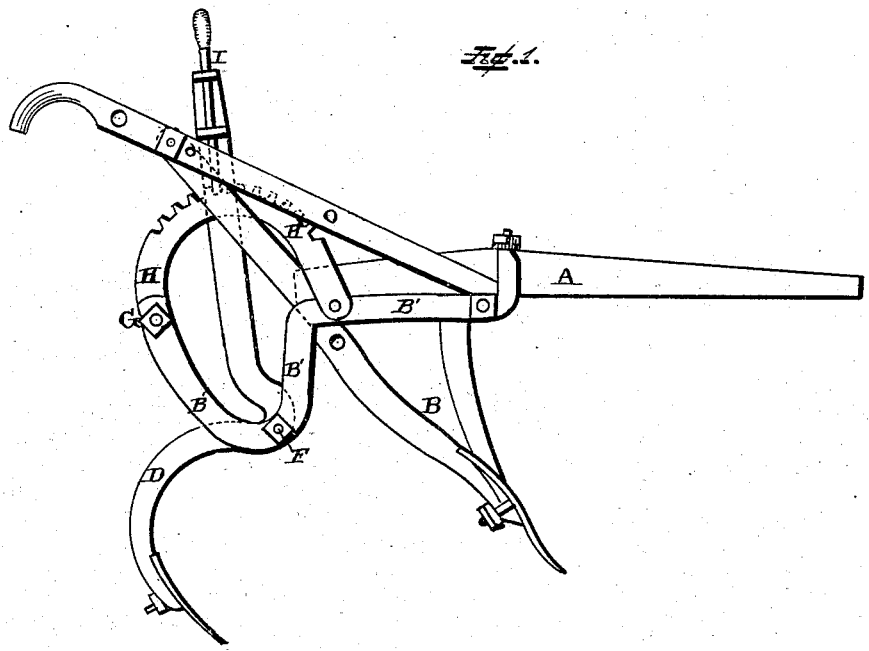
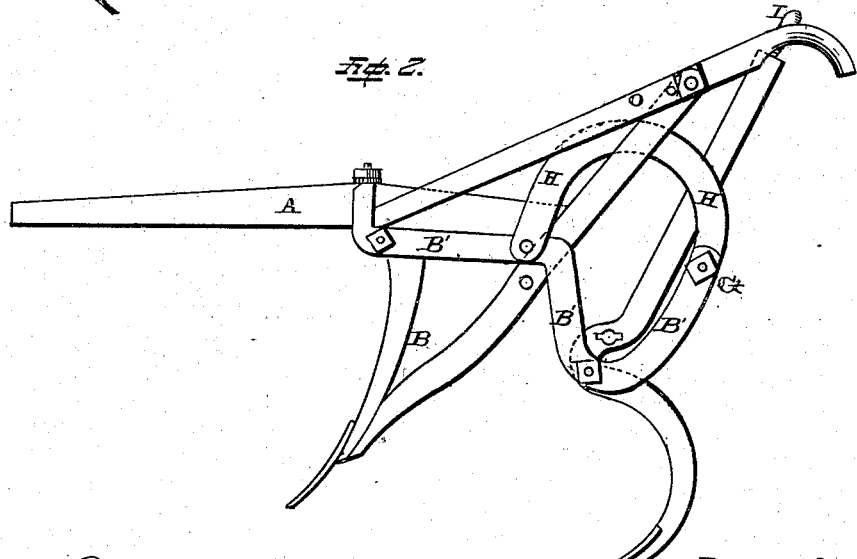
Witnesses
William H. Mortimer
William L. Kerr
Inventor
S. B. Dover,
per
F. A. Lehmann,
Att'y

United States Patent Office.

SAMUEL B. DOVER, OF SUBLIGNA, ASSIGNOR OF ONE-HALF TO JNO. M. WRITE, OF CALHOUN, GEORGIA.

SUBSOIL-PLOW.

SPECIFICATION forming part of Letters Patent No. 269,027, dated December 12, 1882.

Application filed May 17, 1882. (No model.)

*To all whom it may concern:*

Be it known that I, S. B. DOVER, of Subligna, in the county of Chattooga and State of Georgia, have invented certain new and useful Improvements in Subsoil-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in subsoil-plows; and it consists in the combination of a curved frame, which is secured to the rear of the beam, and in which the subsoil-plow is pivoted, with suitable ratchet-plates in which a dog catches for the purpose of holding the subsoil-plow in any desired position, as will be more fully described hereinafter.

Figures 1 and 2 represent side elevations of my invention, taken from opposite sides.

A represents the beam, and B the plow attached thereto, and which can be adjusted so as to run shallow or deep, as may be desired. Securely clamped to opposite sides of the beam at any suitable point are the two parts B', which form the frame in which the subsoil-plow D is pivoted. These frame-pieces B' have their front ends preferably turned upward, so as to be connected together, and then extend backward slightly beyond the rear end of the beam, where they are curved downward, so as to form the bearing F for the subsoil-plow, and from this point they are curved upward to the point G. Between the rear end of these two parts of the frame B' are pivoted the two guide-pieces H, which are curved forward, and have their front ends secured rigidly to the frame-pieces, so as to form a part thereof. Both the frame-pieces B' and these two guide-pieces are separated from each other just far enough to allow the parts which are to move in between them to play freely back and forth. The subsoiler has its standard bent at the place where it is pivoted in the frame B', and has its upper end extend up above the handles, so as to form a lever, by means of which the subsoil-plow can be moved backward for the purpose of raising it above the ground, so that it will not be brought into operation, or for pushing it forward and lowering it any suitable distance below the point of the plow.

In order to adjust the depth at which this subsoil-plow shall run, there may be a suitable series of holes made through the standard, so that the pivotal bolt can be changed from one point to another, so as to raise and lower the standard, as may be desired.

Fastened to the side of the upper end of the lever or extension which forms a part of the subsoiler, is a suitable catch, pawl, or automatically-operated lever, I, which serves to catch in the ratchet-teeth formed in the top edge of the guiding-frame for the purpose of holding the plow in any position into which it may be adjusted. By pushing forward upon the upper end of the lever I the subsoiler will be moved backward either for the purpose of running a shallower furrow or for the purpose of raising its point above the ground, so that it will not be brought into operation at all. When this lever I is pulled backward the subsoiler has its point moved forward and lowered correspondingly, so that it will cut a furrow of its own immediately in the rear of the plow. The handles O are secured to the beam and supported in position in the usual manner.

Having thus described my invention, I claim—

The combination of the plow-beam, the frame B', secured to its rear end, the subsoil-plow D, pivoted in the frame and provided with a dog, and the ratchet-plate H, substantially as shown.

In testimony whereof I affix my signature in presence of two witnesses.

SAMUEL B. DOVER.

Witnesses:
O. N. STARR,
F. A. CANTRUL.